Patented June 20, 1950

2,512,512

UNITED STATES PATENT OFFICE 2,512,512

COMPOUNDS OF THE IMIDAZOLIDONE SERIES AND PROCESS OF MAKING THEM

Donald E. Wolf, Franklin Township, Somerset County, and Karl Folkers, Plainfield, N. J., assignors to Merck & Co., Inc., Rahway, N. J., a corporation of New Jersey No Drawing. Original application November 20, 1946, Serial No. 711,226. Divided and this application January 14, 1948, Serial No. 2,323

5 Claims. (Cl. 260—309)

This invention is concerned generally with novel chemical compounds and processes of preparing the same. More particularly, it relates to novel imidazolidone derivatives which possess physiological activity as growth promoting factors for microorganisms.

This application is a division of our copending application Serial No. 711,226, filed November 20, 1946, now abandoned.

It has now been discovered in accordance with the present invention that dl-4-methyl-5-imidazolidone (2) caproic acid, hereinafter referred to as dl-desthiobiotin can be reacted with thionyl halide to form dl-desthiobiotin acid halide and the latter compound reacted with ammonia to form dl-desthiobiotin amide. This reaction is indicated graphically as follows:

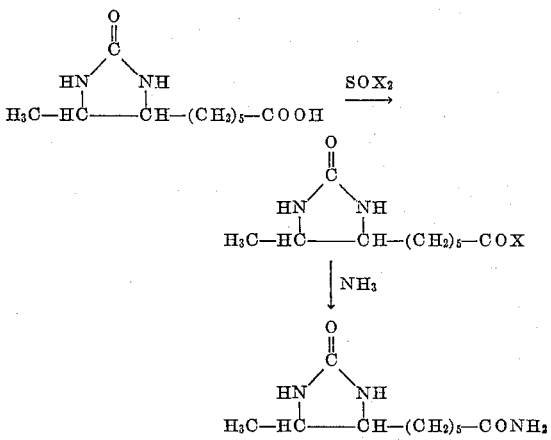

wherein X represents a halogen substituent.

In accordance with a preferred embodiment of the present invention, dl-desthiobiotin is converted to the acid chloride by treatment with thionyl chloride. The excess thionyl chloride is removed by evaporation and dl-desthiobiotin acid chloride remains as a clear oil. Liquid ammonia is added to the reaction mixture and dl-desthiobiotin amide crystals separate from solution. The crystalline product is recovered and washed with water to remove ammonium chloride. While the crystals recovered from the reaction mixture are substantially pure, further purification may be necessary or desirable. This is accomplished by recrystallizing dl-desthiobiotin amide from water or alcohol solution.

The following examples illustrate a method of carrying out the present invention but it is to be understood that these examples are given by way of illustration and not of limitation.

Example 1

About 1 ml. of thionyl chloride is added to about 100 mg. of dl-4-methyl-5-imidazolidone (2) caproic acid at room temperature. After reacting at room temperature for ten minutes, the excess thionyl chloride is removed by evaporation at reduced pressure, leaving dl-4-methyl-5-imidazolidone (2) caproic acid chloride as a clear oil. About 5 ml. of concentrated ammonium hydroxide is added to the clear oil and dl-4-methyl-5-imidazolidone (2) caproic acid amide separates from the solution as a white solid precipitate. The mixture is filtered and the amide recrystalized from water.

Example 2

About 1 ml. of thionyl chloride is added to about 100 mg. of dl-4-methyl-5-imidazolidone (2) caproic acid. After ten minutes standing at room temperature the excess thionyl chloride is removed by evaporation under reduced pressure, leaving dl-4-methyl-5-imidazolidone (2) caproic acid chloride as a clear oil. About 2 ml. of liquid ammonia is added to the acid chloride and dl-4-methyl-5-imidazolidone (2) caproic acid amide separates from solution as a white crystalline solid. The liquid ammonia is allowed to evaporate and the crystals are washed with water to remove ammonium chloride. The crystals are then recrystallized from methanol. The melting point of the recrystallized product is 186–188° C.

Anal. calcd. for $C_{10}H_{19}N_3O_2$: C, 56.31; H, 8.98; N, 19.70. Found: C, 56.40; H, 9.02; N, 19.67.

Modifications may be made in carrying out the present invention without departing from the spirit and scope thereof and the invention is to be limited only by the appended claims.

We claim:

1. As a composition of matter dl-4-methyl-5-imidazolidone (2) caproic acid amide.

2. The process of preparing dl-4-methyl-5-imidazolidone (2) caproic acid amide that comprises reacting dl-4-methyl-5-imidazolidone (2) caproic acid with thionyl halide at room temperature to form dl-4-methyl-5-imidazolidone (2) caproic acid halide and reacting the latter compound with ammonia to form dl-4-methyl-5-imidazolidone (2) caproic acid amide.

3. The process of preparing dl-4-methyl-5-imidazolidone (2) caproic acid amide that comprises reacting dl-4-methyl-5-imidazolidone (2) caproic acid with thionyl chloride at room temperature to form dl-4-methyl-5-imidazolidone (2) caproic acid chloride and reacting the latter compound with ammonia to form dl-4-methyl-5-imidazolidone (2) caproic acid amide.

4. The process of preparing dl-4-methyl-5-imidazolidone (2) caproic acid amide that comprises reacting dl-4-methyl-5-imidazolidone (2) caproic acid halide with ammonia to form dl-4-methyl-5-imidazolidone (2) caproic acid amide.

5. The process of preparing dl-4-methyl-5-imidazolidone (2) caproic acid amide that comprises reacting dl-4-methyl-5-imidazolidone (2) caproic acid chloride with ammonia to form dl-4-methyl-5-imidazolidone (2) caproic acid amide.

DONALD E. WOLF.
KARL FOLKERS.

REFERENCES CITED

The following references are of record in the file of this patent:

UNITED STATES PATENTS

| Number | Name | Date |
|---|---|---|
| 2,397,250 | Dushinsky | Mar. 26, 1946 |

OTHER REFERENCES

Degering, "An Outline of Organic Chemistry," 1941, pp. 86 and 137.

Melville et al., "Science," December 1943, pp. 497–499.

Hoffmann, "Jr. Amer. Chem. Soc.," vol. 66, pp. 51–53, January 1944.